United States Patent [19]

Kuwahara

[11] Patent Number: 5,143,183

[45] Date of Patent: Sep. 1, 1992

[54] EDDY CURRENT BRAKING SYSTEM

[75] Inventor: Tohru Kuwahara, Kawasaki, Japan

[73] Assignee: Isuzu Motors Ltd., Tokyo, Japan

[21] Appl. No.: 733,138

[22] Filed: Jul. 19, 1991

[30] Foreign Application Priority Data

Jul. 30, 1990 [JP] Japan .................................. 2-201820

[51] Int. Cl.⁵ .......................... B60L 7/28; F16D 65/00
[52] U.S. Cl. ..................................... 188/158; 188/161;
188/164; 188/267; 310/93; 310/105
[58] Field of Search ............... 188/158, 159, 161, 164,
188/267; 310/105, 93

[56] References Cited

U.S. PATENT DOCUMENTS

| 2,832,932 | 4/1958 | Baermann | 310/105 X |
| 3,488,534 | 1/1970 | Baermann | 310/105 X |
| 4,309,633 | 1/1982 | Marandet | 310/105 |

FOREIGN PATENT DOCUMENTS

| 0159961 | 6/1990 | Japan | 310/105 |
| 638220 | 6/1950 | United Kingdom | 188/164 |

Primary Examiner—Robert J. Oberleitner
Assistant Examiner—Peter M. Poon
Attorney, Agent, or Firm—John E. Toupal; Harold G. Jarcho

[57] ABSTRACT

A vehicle braking system including a brake structure defining an annular surface; an annular magnet support disposed adjacent to the annular surface; a plurality of circumferentially spaced apart pairs of circumferentially spaced apart permanent magnets mounted on the magnet support and circumferentially spaced apart thereon, each pair arranged with like polarities facing the annular surface and the polarities of the pairs of permanent magnets facing the annular surface alternating circumferentially; an annular pole piece support assembly; and a plurality of ferromagnetic pole pieces mounted on the pole piece support assembly and circumferentially spaced apart in positions between the annular surface and the permanent magnets, each pole piece disposed adjacent to a pair of the permanent magnets and having a circumferential length substantially greater than the circumferential length of either of the adjacent pair of permanent magnets. Also included in the system is an adjustment mechanism for producing relative angular movement between the magnet support and the pole piece support assembly so as to change the circumferential alignment between each of the pole pieces and the pair of permanent magnets adjacent thereto.

15 Claims, 2 Drawing Sheets

EDDY CURRENT BRAKING SYSTEM

BACKGROUND OF THE INVENTION

This invention relates generally to a braking system for use principally on a large vehicle and, more particularly to an eddy-current type retarder for assisting a friction brake.

In an eddy-current type retardation device disclosed in Japanese Patent Laid-Open Publication No. 298948/1989 there is disclosed a braking system in which a ring supports a plurality of permanent magnets circumferentially spaced apart at a uniform pitch and arranged within a brake drum connected to a rotational shaft, and the polarities of the permanent magnets facing the brake drum being alternately different. Between the brake drum and the magnet ring is a non-magnetic, rotatable ring retaining pole pieces having substantially the same area as the permanent magnets and circumferentially spaced at the same pitch.

When the pole pieces are moved to positions directly adjacent to the permanent magnets, a magnetic field is directed thereby through the pole pieces to act on the brake drum. Accordingly, an eddy current flows in the brake drum, producing a braking torque. However, when the pole pieces are rotated into positions wherein each pole piece is directly adjacent to two magnets circumferentially adjacent to each other, a magnetic closed circuit is produced passing through the adjacent permanent magnets, the pole piece adjacent thereto and the magnet support ring. Consequently, the magnetic field applied to the brake drum is significantly weakened, and the braking torque received becomes extremely small.

However, in the above system a problem is presented by magnetic flux that leaks from the center portions of the permanent magnets not covered by an adjacent pole piece. That leakage flux acts on the brake drum producing an undesirable dragging torque. If the thickness of the control cylinder is increased in order to minimize magnetic leakage flux from the permanent magnets to the brake drum, the entire device increases in weight, and a spacing between the permanent magnets and the brake drum is increased. Consequently, the magnetic field which permeates the pole pieces from the permanent magnets and reaches the brake drum at the time of braking decreases and the braking torque is diminished.

The object of the present invention, therefore, is to provide an eddy current type retardation device which without increased weight substantially eliminates magnetic leakage flux during non-braking periods and generates high braking torque during braking periods.

SUMMARY OF THE INVENTION

The invention is a vehicle braking system including annular magnet support disposed adjacent to the annular surface; a plurality of circumferentially spaced apart pairs of circumferentially spaced apart permanent magnets mounted on the magnet support means and circumferentially spaced apart thereon, each pair arranged with like polarities facing the annular surface and the polarities of the pairs of permanent magnets facing the annular surface alternating circumferentially; an annular pole piece support assembly; and a plurality of ferromagnetic pole pieces mounted on said pole piece support assembly and circumferentially spaced apart in positions between the annular surface and the permanent magnets, each pole piece disposed adjacent to a pair of the permanent magnets and having a circumferential length substantially greater than the circumferential length of either of the adjacent pair of permanent magnets. Also included in the system is an adjustment mechanism for producing relative angular movement between the magnet support and the pole piece support assembly so as to change the circumferential alignment between each of the pole pieces and the pair of permanent magnets adjacent thereto. Selective braking and non-braking periods are established by changing the alignment between the pole pieces and magnets.

According to one feature of the invention, the pole piece support provides non-magnetic gaps between the circumferentially spaced apart pole pieces. The gaps facilitate the application of a magnetic field to the brake structure during braking periods.

According to another feature of the invention, the mechanism is adapted to provide alternately a braking condition in which each magnet pair is aligned with an adjacent pole piece and a non-braking condition in which the permanent magnets in each pair straddle one of the gaps. These arrangements establish, respectively, a magnetic circuit including the brake structure and one excluding the brake structure.

According to yet another feature of the invention, the circumferential length of each pole piece is substantially equal to the combined circumferential lengths of the adjacent pair of permanent magnets and the spacing therebetween. This arrangement allows the pole pieces to fully shield the brake structure from leakage magnetic flux during non-braking periods.

According to still other features of the invention, the annular magnet support is a ring disposed radially adjacent to the annular surface means which is cylindrical. This arrangement facilitates use of the invention with a conventional drum brake.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
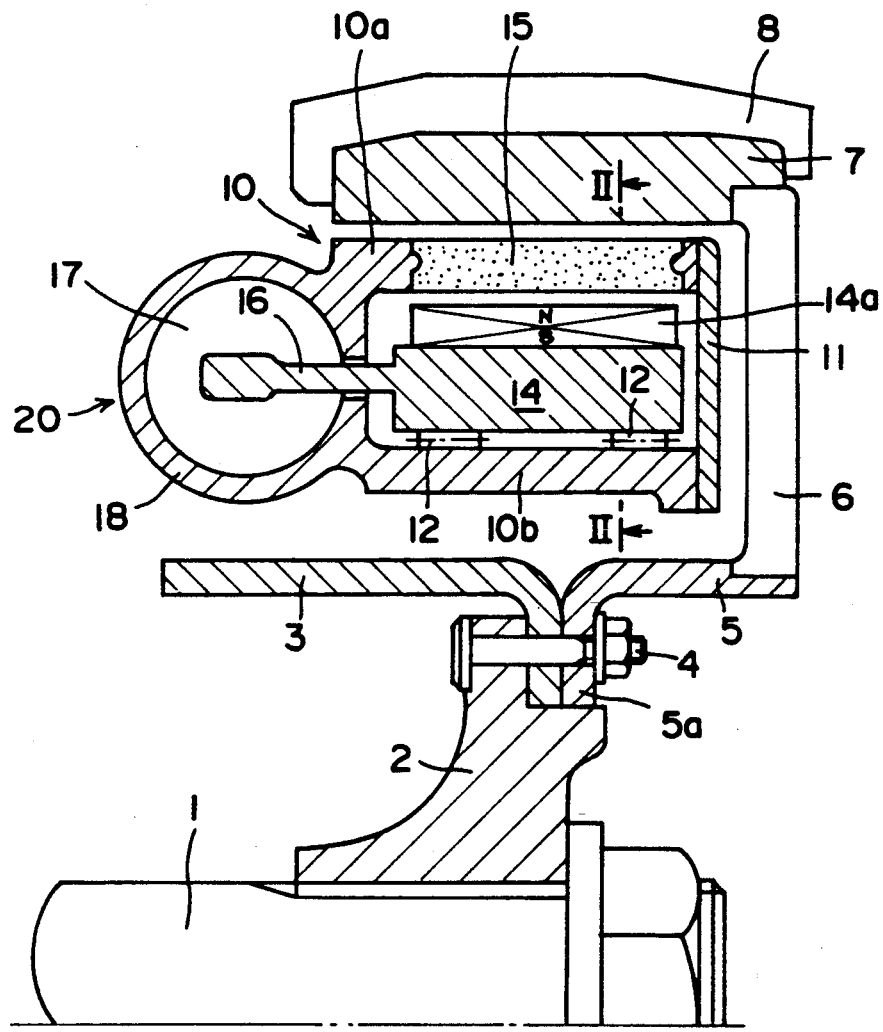
FIG. 1 is a side sectional view of an eddy current type retardation device according to the present invention.

An eddy current type retardation braking system according to the present invention comprises a brake drum 7 for example, to a rotatable output shaft 1 of a vehicular transmission or speed change gear (not shown). The drum 7 defines an annular inwardly directed cylindrical surface. A fixed annular pole piece supporting frame 10 formed of a non-magnetic material is arranged radially interiorly of the brake drum 7, and an annular magnet support ring 14 is rotatably supported radially within the fixed frame 10. Connecting the brake drum 7 and a boss 5 are spokes 6. A flange portion 5a of the boss 5 and an end wall portion of a parking brake drum 3 are secured by bolts 4 to a mounting flange 2 which is fitted into a rotational shaft 1.

Cooling for the brake drum 7 is provided by cooling fins 8.

The cylindrical fixed frame 10 includes an annular C-shaped portion defining an annular chamber closed by an annular cover plate 11. Preferably, the fixed frame 10 is secured by suitable means to a gear box wall of a transmission (not shown). A plurality of ferromagnetic plates or pole pieces 15 are fastened to an outer cylindrical portion 10a of the fixed frame 10 at circumferentially spaced apart positions of uniform pitch. The frame 10 provides non-magnetic gaps between the pole pieces 15. Preferably, the pole pieces 15 are cast within the fixed frame 10 when it is molded. The magnet support ring 14 is rotatably supported within the fixed frame 15 on an inner cylindrical portion 10b thereof.

Fluid pressure actuators 20 (only one is shown) are connected at peripherally equal intervals to a left end wall of the fixed frame 10. Each fluid pressure actuator 20 comprises a cylinder 18 into which a piston 17 is fitted. An arm 16 projecting from the magnet support ring 14 via a slot in a left end wall of the fixed frame 10 is connected to a rod projecting outwardly from the piston 17. A plurality of permanent magnets 14a totaling twice the number of pole pieces 15 are circumferentially spaced apart on the support ring 14 at a uniform pitch one half that of the pole pieces 15.

Figure 2:
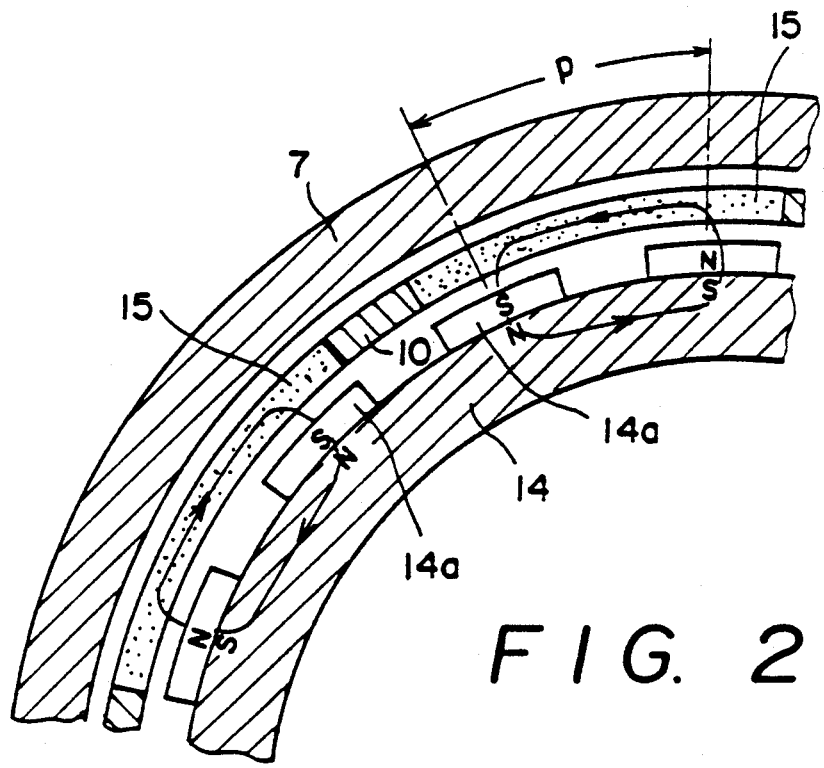
FIG. 2 is a partial front sectional view showing the relationship between pole pieces and a magnet supporting ring during non-braking periods.
Figure 3:
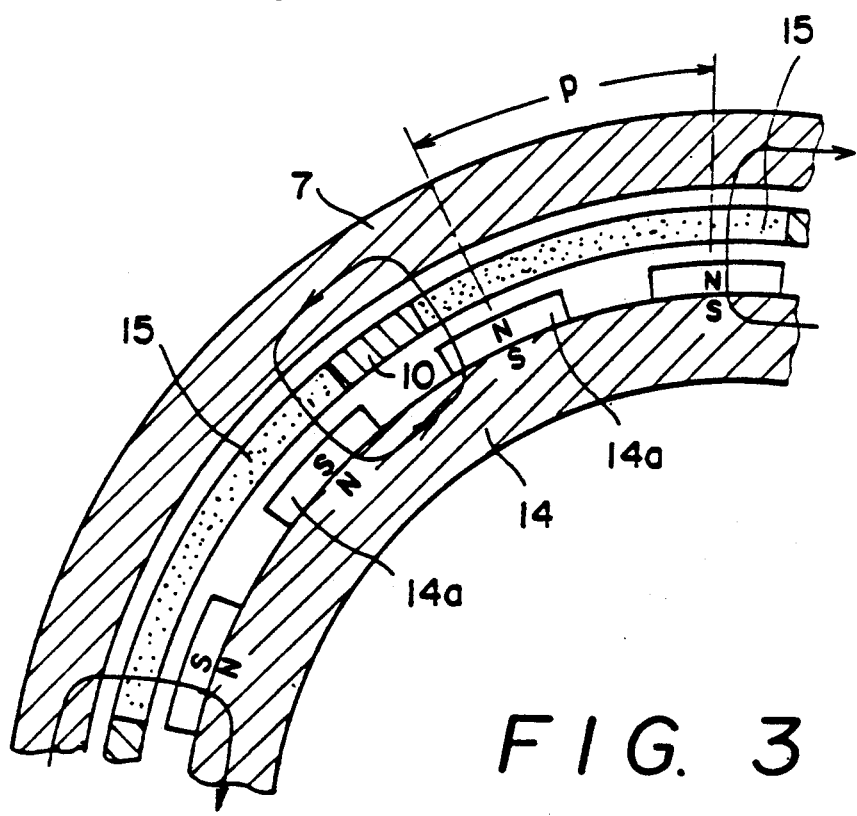
FIG. 3 is a partial front sectional view showing the relationship between pole pieces and a magnet supporting ring during braking periods.

As shown in FIGS. 2 and 3, the permanent magnets 14a include circumferentially spaced apart pairs of magnets arranged with like polarities facing the cylindrical surface of the brake drum 7. The polarities of the magnet pairs facing the brake drum 7 alternate circumferentially on the ring 14 as shown. Also each pole piece 15 has a circumferential length substantially greater than the circumferential lengths of the magnets 14a and preferably equal to the combined lengths of a pair of adjacent magnets 14 and the space therebetween as also shown.

OPERATION

During non-braking periods, the support ring 14 is rotated relative to the fixed frame 10 into a position wherein the gap between each pair of adjacent pole pieces 15 is straddled by a pair of like polarity magnets 14a as shown in FIG. 2. With that arrangement, a magnetic closed circuit is created between each pole piece 15, opposite polarity adjacent magnets 14a and the magnet support ring 14. Consequently, a magnetic field is not applied to the brake drum 7. Since the pole pieces 15 cover the entire outer peripheral surface of the radially adjacent two permanent magnets 14a, substantially no magnetic flux leaks by the pole pieces 15 to the brake drum 7 which, therefore, is not subjected to a dragging torque.

During braking periods, the magnet support ring 14 is rotated relative to the fixed frame 15 into a position wherein each pair of like polarity permanent magnets 14a is radially aligned with an adjacent pole piece 15 as shown in FIG. 3. Accordingly, each pair of adjacent unlike polarity magnets 14a apply a magnetic field to the brake drum 7 via a pair of circumferentially adjacent pole pieces 15 and the support ring 14 as shown. When the rotating brake drum 7 crosses the applied magnetic field, an eddy current flows and the brake drum 7 receives a braking torque.

Obviously, many modifications and variations of the present invention are possible in light of the above teachings. For example, while in the above-described embodiment, the magnet support ring 14 is rotated angularly in opposite directions to alter the circumferential radial alignment between the pole pieces 15 and the permanent magnets 14a, it is to be noted that the fixed frame rotated by, for example, an electric motor (not shown), and the magnet support ring 14 may be fixed. It is to be understood, therefore, that the invention can be practiced otherwise than as specifically described.

What is claimed is:

1. A vehicle braking system comprising:
   a brake structure defining an annular surface means;
   annular magnet support means disposed adjacent to 1 said annular surface;
   a plurality of circumferentially spaced apart pairs of circumferentially spaced apart permanent magnets mounted on said magnet support means and circumferentially spaced apart thereon, each said pair arranged with like polarities facing said annular surface and the polarities of said pairs of permanent magnets facing said annular surface alternating circumferentially;
   annular pole piece support means;
   a plurality of ferromagnetic pole pieces mounted on said pole piece support means and circumferentially spaced apart in positions between said annular surface and said permanent magnets, each said pole piece disposed adjacent to a pair of said permanent magnets and having a circumferential length substantially greater than the circumferential length of either of said adjacent pair of permanent magnets; and
   adjustment means for producing relative angular movement between said magnet support means and said pole piece support means so as to change the circumferential alignment between each of said pole pieces and said pair of permanent magnets adjacent thereto.

2. A braking system according to claim 1 wherein said pole piece support means provides non-magnetic gaps between said circumferentially spaced apart pole pieces.

3. A braking system according to claim 2 wherein said adjustment means is adapted to provide alternately a braking condition in which each said pair is aligned with said adjacent pole piece and a non-braking condition in which said permanent magnets in each said pair straddle one of said gaps.

4. A braking system according to claim 3 wherein said circumferential length of each said pole piece is substantially equal to the combined circumferential lengths of said adjacent pair of permanent magnets and the spacing therebetween.

5. A braking system according to claim 4 wherein said permanent magnets are spaced apart on said magnet support means at a uniform pitch.

6. A braking system according to claim 1 wherein said annular magnet support means is disposed radially adjacent to said annular surface means.

7. A braking system according to claim 6 wherein said pole piece support means provides non-magnetic gaps between said circumferentially spaced apart pole pieces.

8. A braking system according to claim 7 wherein said adjustment means is adapted to provide alternately a braking condition in which each said pair is aligned with said adjacent pole piece and a non-braking condition in which said permanent magnets in each said pair straddle one of said gaps.

9. A braking system according to claim 8 wherein said circumferential length of each said pole piece is substantially equal to the combined circumferential lengths of said adjacent pair of permanent magnets and the spacing therebetween.

10. A braking system according to claim 9 wherein said permanent magnets are spaced apart on said magnet support means at a uniform pitch.

11. A braking system according to claim 6 wherein said brake structure is a drum, said annular surface means is a cylindrical surface thereon, and said annular magnet support is a cylindrical ring disposed radially within said cylindrical surface.

12. A braking system according to claim 11 wherein said pole piece support means provides non-magnetic gaps between said circumferentially spaced apart pole pieces.

13. A braking system according to claim 12 wherein said adjustment means is adapted to provide alternately a braking condition in which each said pair is aligned with said adjacent pole piece and a non-braking condition in which said permanent magnets in each said pair straddle one of said gaps.

14. A braking system according to claim 13 wherein said circumferentially length of each said pole piece is substantially equal to the combined circumferential lengths of said adjacent pair of permanent magnets and the spacing therebetween.

15. A braking system according to claim 14 wherein said permanent magnets are spaced apart on said magnet support means at a uniform pitch.

* * * * *